July 5, 1932.  H. H. CHESNY  1,865,833
PROCESS OF FORMING SODIUM BICARBONATE
Filed Jan. 21, 1929
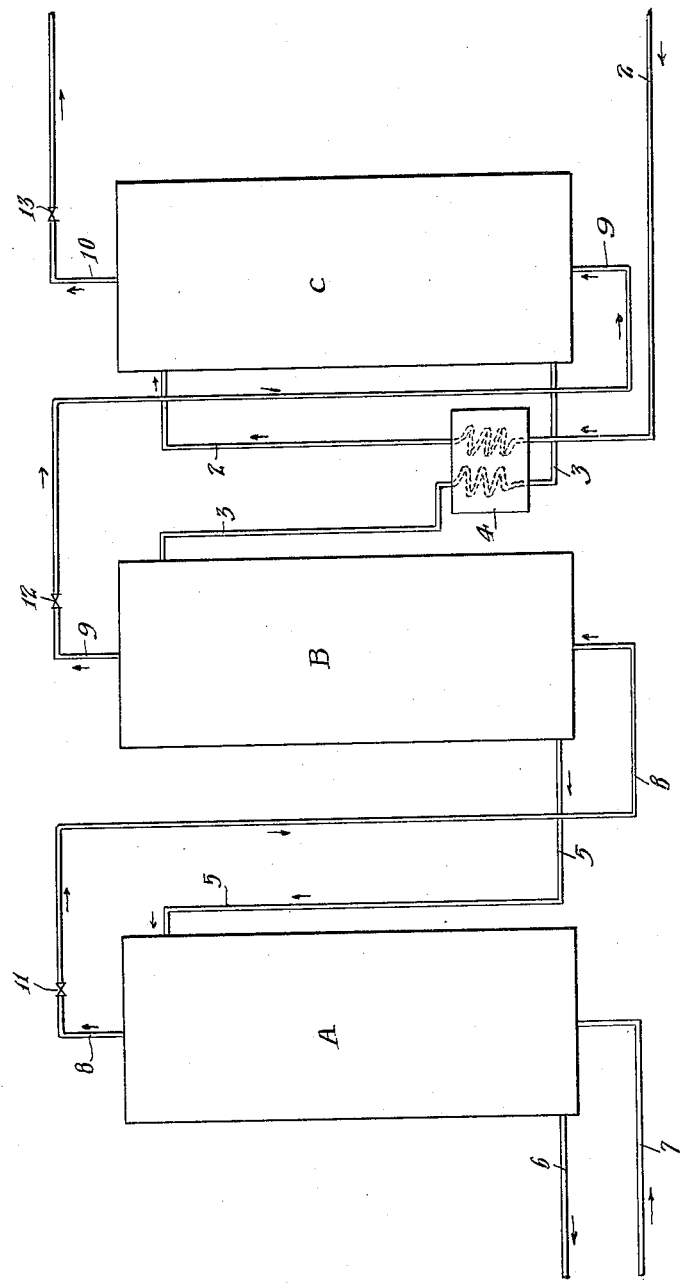
Inventor
Heinz H. Chesny
By Lyon+Lyon
Attorneys Patented July 5, 1932

1,865,833

UNITED STATES PATENT OFFICE

HEINZ H. CHESNY, OF LOS ANGELES, CALIFORNIA

PROCESS OF FORMING SODIUM BICARBONATE

Application filed January 21, 1929. Serial No. 333,986.

This invention relates to a process of forming sodium bicarbonate and refers particularly to the type of process in which sodium bicarbonate is precipitated from alkaline solutions by carbonating the solutions.

It is the general object of this invention to provide a process by which sodium bicarbonate may be formed, by the action of carbon dioxide bearing gas upon alkaline solutions, in a higher state of purity and of a superior physical structure than has heretofore been obtained.

It is a further object of this invention to provide a process by which higher yields, higher reaction rates and better efficiency may be obtained in the production of sodium bicarbonate.

The process of the present invention is applicable generally to the formation of sodium bicarbonate from alkaline solutions. While certain phases of this invention are applicable to the production of sodium bicarbonate from ammoniacal salt solutions, the process is particularly adapted to solutions which contain sodium chlorid and sodium sulphate, with or without other constituents. Examples of alkali solutions of the latter type are the alkali brines from Owen's and Searle's Lake, California, or can be formed by solutions of salts obtained from these lakes.

Sodium bicarbonate is generally manufactured in order to form a material which can be calcined into soda ash or anhydrous sodium carbonate. It has been the general practice, in the manufacture of sodium bicarbonate, to allow carbon dioxide bearing gas to act upon alkaline solution of the above mentioned type in order to convert the carbonate into the lesser soluble bicarbonate or sesquicarbonate or mixtures of both in order to separate a sparingly soluble carbonate which can be calcined to produce anhydrous sodium carbonate. These salts precipitate and are removed by filtration, centrifugation, or any other means of separation. As the process is generally carried out, the reaction between the solution and the gas takes place in tall tanks or towers provided with diaphragms or other baffle means through which the liquor passes countercurrent to the gas, the latter entering at the bottom under a pressure sufficient to overcome the hydrostatic head and issuing to the atmosphere at the open top.

It is the common practice to employ temperatures ranging from 27° C. to 40° C. in the carbonators. During the reaction between the carbon dioxide and the alkaline solutions, a rise in temperature of approximately 10° C. occurs, due to the heat liberated by the reaction and by the crystallization of the precipitated salts. For this reason, it has been the practice to keep the temperature of the entering solution low enough in order to maintain the operating temperatures as stated above. As this process is carried out, it has been the practice to limit the concentration of the carbonate in the solution to be treated to less than 10 percent by weight, and to limit the concentration of the carbon dioxide in the gas to less than 40% by volume, as low a limit as 23 percent having been reported, or to limit the supply of the carbon dioxide or both. It has generally been found that with a process operating within the above described limit of temperature and partial pressure of gas when the carbonate in the solution to be processed exceeds 10% by weight, a poor crystal is obtained.

The main difficulty encountered in precipitating bicarbonates from a solution resides in the precipitation of the bicarbonates in fine crystals. When fine crystals are formed, they are difficult to separate as they have the property of retaining large amounts of the mother liquor. If the precipitated bicarbonate retains a large amount of mother liquid, not only is the purity of the soda ash produced therefrom affected, but the whole soda process is vitally affected. The mother liquor which is retained in the fine crystal mass may contain in addition to sodium chlorid and sulphate, aluminates, silicates and borates, and organic matter. The presence of organic matter in the precipitated bicarbonate presents a serious difficulty in that it chars during the calcining operation and renders the resulting soda ash dark brown or grey, according to the degree of decomposition in the furnace. To at least partially remove these impurities, a thorough and prolonged washing of the filter cake is required which greatly lowers the yields due to partially dissolving of the precipitated alkali. A complete displacement of the residual liquor from the crystal mass is, however, impossible, due to the fineness of the solid particles. Furthermore, serious difficulties often arise due to the closing of the filter cloth or screens by the small crystals.

The multitude and fineness of the alkali crystals causes a great increase in the capillary forces within the filter cake which thereby tenaciously retains the mother liquor or wash water. This fact makes it hightly difficult or impossible to obtain filter cakes containing less than 18% to 25% moisture and in some cases, filter cakes containing as high as 40% moisture are obtained. Not only does the high moisture content prevent the manufacture of a pure product, but it is highly detrimental to plant equipment, especially to the calcining furnaces wherein it corrodes the shell of the furnace, and causes also a high fuel consumption, necessitated by the evaporation of large amounts of occluded moisture.

It is the principal object of this invention to produce large granular crystals of sodium bicarbonate which allow a more complete removal of the mother liquor. By the process of this invention, the crystals can be obtained in a highly pure state containing, for example, 10% or less of moisture and not over 15%, and also the crystals are obtained in a size and shape which makes it possible to produce by calcination, a soda ash consisting of large and coarse particles, these particles usually being obtained in the form of stellatic clusters.

It is another feature of my invention to provide a process which will obtain high yields of bicarbonate not only by decreasing wash losses, but also by increasing the percentage recovery of the bases of the initial alkali.

Another object of this invention is to provide a process of forming sodium bicarbonate from alkali solutions in which the rate of reaction between the solution and carbonating gas is increased, thereby providing a more advantageous utilization of plane equipment.

The present invention also provides a process in which the losses of carbon dioxide gas in the mother liquors and in the carbonator exit gas are lowered. This factor is of prime importance on account of the considerable cost of this gas which amounts to approximately one-third of the total cost of production.

I have discovered that crystals of increased size and lower moisture content may be precipitated from alkaline solutions if the temperature of the solution during operation is maintained above a temperature of not less than 46° C. Inasmuch as the bicarbonate is increasingly soluble in the mother liquor as the temperature increases, it is desirable to keep the temperature of reaction as low as is consistent with proper crystal formation, and I have determined that the most advantageous conditions of precipitating bicarbonate are between the temperature limits of 46° C. and 76° C. Within these limits of temperature, I have found that despite the increased solubility of the bicarbonate in the solution, a larger yield of a better and more pure product can be obtained.

I have further discovered that the formation of a precipitate of sodium bicarbonate free from the sesqui-carbonate of sodium may be insured by conducting the carbonating action with a positive back pressure of carbon-dioxide gas on the upper level of the solution being carbonated, as distinguished from the usual practices of directly venting the carbon dioxide to the atmosphere.

It appears that sesqui-carbonate of soda is formed in a carbonated alkaline solution whenever the partial pressure of carbon dioxide gas passing through the solution falls below certain limits and moreover, the carbonates are precipitated at least partially in the form of the sesqui-carbonate whenever the partial pressure of carbon dioxide gas falls below certain limits.

I prefer to employ a back pressure of carbon dioxide, around five pounds per square inch. Lesser partial pressures of carbon dioxide may be employed in this operation, but with a partial pressure as given in the above example, the formation of sesqui-carbonate is eliminated.

The present invention, together with various further objects and advantages of the present invention, will best be understood from the description of a process which embodies the invention. For this purpose, there is hereafter described, with reference to the accompanying drawing, the preferred form or example of a process embodying the invention.

The drawing represents diagrammatically, one form of an apparatus in which the process of this invention may be practiced.

In accordance with the preferred process, an alkaline solution containing sodium carbonate, and usually other salts, is treated with carbon dioxide bearing gas. For example, the alkaline solution may be brine from Owen's or Searle's Lakes, or similar brines or solutions obtained by treating these brines or by dissolving solids in such brines or artificial solutions. Besides sodium carbonate, the solutions generally processed by this invention may contain sodium bicarbonate, sodium sulphate, sodium chlorid, potassium chlorid, lithium chlorid, silica, alumina, phosphate, arsenate, organic matter and other constituents. The alkali solution to which the process is preferably applied contains, for example, 170 grams per liter of sodium carbonate, 100 to 200 grams per liter of sodium chlorid and 50 to 170 grams per liter of sodium sulphate, besides containing smaller amounts of other constituents.

Now referring more particularly to the drawing, in which

A, B and C respectively indicate suitable receptacles or tanks preferably of closed type. The alkaline solution heated preferably above 46° C. and usually at 50° C., is pumped into the vessel C, entering at the top of said vessel through line 2. The solution is withdrawn from the bottom of vessel C, through line 3 and preferably passed through a cooler or heat exchanger 4 into the top of a second vessel B. From vessel B the solution is withdrawn through the line 5 and introduced into the top of the vessel A. From the vessel A, the solution is withdrawn at the bottom by means of the line 6.

Simultaneously carbon dioxide bearing gas which preferably contains between 40 and 60% carbon dioxide by volume or more, is passed under pressure which is preferably between 35 and 50 pounds per square inch gauge, through the line 7 into the tank A, which is the last tank traversed by the alkaline solutions, whereby the gas is caused to flow countercurrent through the process to the flow of alkaline solution. The gas which rises up through the vessel A is withdrawn from the top of said vessel by line 8 and introduced into the bottom of the vessel B. In turn, the gas leaving the top of vessel B is withdrawn by the line 9 and introduced into the bottom of the vessel C. The gas from vessel C is withdrawn from the top by means of line 10. Preferably, suitable valves 11, 12 and 13 are provided on the gas lines for controlling the pressure within the various parts of the process.

In order to control accurately the carbonating process to insure the proper crystal formation in the subsequent steps of the process, I prefer to carry out the process so that in the vessel C, which is the saturating or concentrating zone, the fresh alkaline solution comes into contact with sufficient carbon dioxide to nearly saturate the solution with bi-carbonate without, however, allowing a precipitation of alkali to take place in the vessel. An important feature of the process is conducting this initial saturation of the solution under the temperature conditions of 46 to 76° C. which are proper for the precipitation of the desired coarse crystals. The carbon dioxide bearing gas employed in the saturating zone of the process, is the exit gas from the preceding vessel B which constitutes the precipitating zone of the process. As an example of suitable operating conditions, without desiring to restrict the invention thereto, the carbon dioxide gas entering vessel C may be at a pressure of 33 pounds per square inch and contain 8–18% carbon dioxide.

The concentrated solution withdrawn from the vessel C through the line 3 is preferably cooled to a temperature of 10 degrees lower than that desired in the vessel B, since in the vessel B, the solution will be reheated to the desired operating temperature through the heat of formation and crystallization of the sodium bicarbonate. In the vessel B, the concentrated solution of bicarbonate comes into contact with the carbon dioxide gas leaving vessel A. For example, this gas may enter the vessel B at a pressure of 39 pounds per square inch and contain 40–60% of carbon dioxide. Within the vessel B, this gas reacts upon the solution and converts the major portion or all of the alkali into sodium bicarbonate, which, due to the high temperature of treatment, crystallizes and precipitates from the solution in crystals of a size and form which are readily freed from moisture content, i. e., the moisture content of such crystals may be readily reduced by filtration or centrifugation, to below 15% and generally 10% or lower. In order that in this crystallizing operation, all of the alkali will be precipitated as the bicarbonate of soda rather than the sesqui-carbonate of soda, it is highly desirable to have a positive control over the partial pressure of the carbon dioxide gas leaving the precipitating zone of the process. It is partially for this reason that in the preferred form of the process the precipitating zone of the process is made separate from the saturating or concentrating zone.

By the process of the present invention, the pressure of the exit gases from vessel B may be controlled to insure a sufficient pressure of carbon dioxide being maintained upon the solution within the precipitating zone to prevent formation of the sesqui-carbonate. The necessary partial pressure for this purpose is approximately 3.5 pounds per square inch of carbon dioxide and for operating conditions, I prefer to employ a pressure of carbon dioxide leaving line 9, of five pounds per square inch, or greater.

The reaction which takes place in the vessel B converts the major portion or all of the alkali in the sodium bicarbonate. The process may be stopped at this stage of the process, but preferably the crystal sludge from tank B is transferred through line 8 to the third vessel A. At this point, the liquor may still contain some unconverted alkali or may still contain some bicarbonate in a state of supersaturation. The crystal sludge is here brought into contact with the fresh incoming gas to be completely carbonated or to release supersaturation. The gas enters this vessel for example, under a pressure of 46 pounds, per square inch, containing 40 to 60% carbon dioxide.

The mother liquor and crystal sludge leaving the vessel A through line 6 may be subsequently separated by any desired means, such as by filtration or centrifugation. The crystals are obtained in a coarse and granular form and hold little of the mother liquor. Moreover, due to the coarse granular form of such crystals, they may be washed with a small amount of wash water with a correspondingly low loss and subsequently converted into soda ash of high purity and excellent particle shape and size.

By the process of the present invention, due to carrying out the process in a plurality of stages, and high temperature of treatment, the carbonating reaction may be conducted rapidly and at the same time, under the conditions to insure the best possible reaction. For example, the carbon dioxide gas may be supplied to the process in the saturating zone at a rate in excess of one-half pound of carbon dioxide per minute for 1000 gallons of solution, and when so applied, would insure maintaining within the process the desired partial pressures of carbon dioxide.

While the process as herein described is well adapted to carry out the objects of the present invention, it is understood that various modifications may be made without departing from the principles of the invention, and the invention includes all such changes and modifications as come within the scope of the appended claims.

I claim:

1. A process of precipitating sodium bicarbonate from solutions of sodium carbonate which comprises, contacting the solution with carbon dioxide at temperatures between 46 degrees and 76 degrees C. and under a partial pressure of carbon dioxide sufficient to substantially suppress formation of sesqui-carbonates.

2. A process of obtaining a high rate of reaction between a sodium carbonate solution and carbon dioxide gas which comprises passing the carbon dioxide through the solution with the solution at a temperature between 46° and 76° C. and with the carbon dioxide under partial pressures of from 5 to 35 pounds per square inch, and in which the carbon dioxide is supplied at a rate in excess of one-half pound of carbon dioxide per minute per thousand gallons of solution treated.

3. A process of obtaining sodium bicarbonate at a relatively high rate of reaction and in large crystals by the action of carbon dioxide bearing gas upon sodium carbonate solutions in which the carbon dioxide bearing gas is supplied to the solution at a rate in excess of one-half pound per minute per thousand gallons of solution treated and under a partial pressure of carbon dioxide of from 5 to 35 pounds per square inch, the solution being at a temperature between 46° and 76° C., while being treated, the solution being then further carbonated with the carbon dioxide bearing gas in a separate vessel at a rate in excess of a half pound carbon dioxide per minute per thousand gallons of solution treated, and under a partial pressure of carbon dioxide of from 5 to 35 pounds per square inch, the solution being kept at temperatures of 46° to 76° C., until at least a major part of the alkali is precipitated as sodium bicarbonate.

4. A process as set forth in claim 3 in which the solution and crystals obtained in the second carbonating step are further treated in a separate vessel at a rate in excess of a half pound carbon dioxide per minute per thousand gallons of solution treated, and under a partial pressure of carbon dioxide of from 5 to 35 pounds per square inch, the solution being kept at temperatures of 46° to 76° C.

5. A process of obtaining sodium bicarbonate at a relatively high rate of reaction and in large crystals by the action of carbon dioxide bearing gas upon sodium carbonate solutions in which the carbon dioxide bearing gas is supplied to the solution at a rate in excess of one-half pound per minute per thousand gallons of solution treated and under a partial pressure of carbon dioxide of from 5 to 35 pounds per square inch, the solution being at a temperature between 46° and 76° C., while being treated, the carbonating operation being continued until the solution is nearly ready to precipitate bicarbonate, the solution being then further carbonated with carbon dioxide bearing gas in a separate vessel at a rate in excess of a half-pound carbon dioxide per minute per thousand gallons of solution treated, and under a partial pressure of carbon dioxide of from 5 to 35 pounds per square inch, the solution being kept at temperatures of 46° to 76° C., until at least a major part of the alkali is precipitated as sodium bicarbonate.

6. A process of obtaining sodium bicarbonate by the action of carbon dioxide bearing gas upon sodium carbonate solutions which comprises, carbonating the solution to substantial saturation with respect to sodium bicarbonate, then, in a separate body, further carbonating said solution with carbon dioxide bearing gas under higher pressure, which gas contains sufficient carbon dioxide that the exit gas from said body will possess a partial pressure of carbon dioxide sufficient to inhibit formation of sesqui-carbonates, and restricting the flow of said carbon dioxide bearing gas from said second body of alkaline solution so that it leaves the same under a pressure above atmospheric.

Signed at Los Angeles, California this 9th day of January 1929.

HEINZ H. CHESNY.